(12) United States Patent
Nakano

(10) Patent No.: US 6,725,041 B1
(45) Date of Patent: Apr. 20, 2004

(54) MOBILE COMMUNICATION TERMINAL APPARATUS AND RECEIVED SIGNAL STRENGTH DETECTING METHOD

(75) Inventor: Takayuki Nakano, Yokosuka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 531 days.

(21) Appl. No.: 09/807,282
(22) PCT Filed: Aug. 10, 2000
(86) PCT No.: PCT/JP00/05349
§ 371 (c)(1),
(2), (4) Date: Apr. 11, 2001
(87) PCT Pub. No.: WO01/13546
PCT Pub. Date: Feb. 22, 2001

(30) Foreign Application Priority Data

Aug. 18, 1999 (JP) ............................................ 11-231590

(51) Int. Cl.[7] ................................................. H04Q 7/20
(52) U.S. Cl. ........................ 455/436; 455/437; 455/441
(58) Field of Search ................................ 455/436, 437, 455/441, 443, 524, 525, 226.1, 226.2; 370/331, 332

(56) References Cited

U.S. PATENT DOCUMENTS

| | | | |
|---|---|---|---|
| 4,945,732 A | | 8/1990 | Haruyama et al. |
| 5,367,559 A | * | 11/1994 | Kay et al. .................... 455/425 |
| 5,640,414 A | | 6/1997 | Blakeney, II et al. |
| 5,870,666 A | * | 2/1999 | Tanaka et al. ............ 455/67.11 |
| 5,960,335 A | * | 9/1999 | Umemoto et al. ........ 455/226.2 |
| 6,256,500 B1 | * | 7/2001 | Yamashita ................... 455/441 |

FOREIGN PATENT DOCUMENTS

| | | |
|---|---|---|
| GB | 2333424 | 7/1999 |
| JP | 1218135 | 8/1989 |
| JP | 9271056 | 10/1997 |
| JP | 11205843 | 7/1999 |
| WO | 9819491 | 5/1998 |

OTHER PUBLICATIONS

Supplementary European Search Report dated Feb. 17, 2003.
H. G. Ebersman, et al.; "Handoff Ordering using Signal Prediction Priority Queuing in Personal Communications Systems", IEEE International Symposium on Personal, Indoor and Mobile Radio Communications, vol. 2, 1995, pp. 824–828, XP002150941.

* cited by examiner

Primary Examiner—Vivian Chin
Assistant Examiner—Minh D. Dao
(74) Attorney, Agent, or Firm—Stevens, Davis, Miller & Mosher, LLP.

(57) ABSTRACT

A determining section 106 compares received signal strengths of the respective pilot signals stored in a strength table 105 with a predetermined threshold of received signal strength, and reports a pilot signal exceeding the predetermined threshold to a control section 107. The control section 107 instructs a strength extracting section 104 to increase the number of received signal strength extraction times of the pilot signal exceeding the predetermined threshold. The strength extracting section 104 extracts received signal strengths from the respective pilot signals based on the instructed number of times. The strength table 105 detects the received signal strengths of the respective pilot signals at timing when the number of received signal strength extraction times reaches the predetermined number of times.

5 Claims, 6 Drawing Sheets

MOBILE COMMUNICATION TERMINAL APPARATUS AND RECEIVED SIGNAL STRENGTH DETECTING METHOD

TECHNICAL ART

The present invention relates to a mobile communication terminal apparatus and a received signal strength detecting method in a mobile communication system such as a cellular phone, a car phone, and the like.

BACKGROUND ART

A handover, which is performed in a mobile communication system using a code division multiple access (CDMA), is implemented when a mobile station detects received signal strengths from peripheral cells and reports the detected received signal strengths to a control station via a base station in communication.

Namely, the mobile station despreads pilot signals received from a plurality of base stations positioned at the peripheral cells, and detects received signal strengths of the respective pilot signals. The control station performs comparison among the received signal strengths of the respective pilot signals of the peripheral cells reported to the control station via the base station in communication by the mobile station. The control station selects a cell providing the highest received signal strength of pilot signals as a handover destination cell, whereby the handover is carried out. The method of the handover in the mobile communication system using CDMA is described in, for example, U.S. Pat. No. 5,267,261.

An explanation will be next given of a received signal strength detecting method that is used by a conventional radio receiving apparatus in the mobile station. FIG. 1 is a block diagram showing a configuration of the conventional radio receiving apparatus.

The respective pilot signals of mobile station peripheral cells received by an antenna 2 of a radio receiving apparatus 1 are subjected to predetermined radio processing and demodulation processing by a receiving section 3. Then, the strength extracting section 4 despreads these pilot signals based on a phase and a spreading code, which are indicated by a control section 5, so as to extract received signal strengths. The received signal strengths of the respective pilot signals are stored in a strength table 6. Then, the strength table 6 calculates average values of the received signal strengths at timing to be described later, and the calculated values are outputted to the other apparatus (not shown) in the mobile station from an output terminal 7. The average values of the received signal strengths of the respective pilot signals are subjected to predetermined processing by the other apparatus (not shown) of the mobile station. Thereafter, the mobile station reports the resultant to the control station via the base station currently in communication.

Next, the following will explain an operation in which the radio receiving apparatus 1 detects received signal strengths of the respective pilot signals of the mobile station peripheral cells. FIG. 2 is a view illustrating that the radio receiving apparatus 1 detects received signal strengths of the respective pilot signals of the mobile station peripheral cells. In FIG. 2, it is assumed that the pilot signals received from peripheral cells A, B, C, and D are pilot signals A, B, C, and D, respectively, the received signal strengths of the respective pilot signals are illustrated under the respective pilot signals, and that the received signal strength increases as the number becomes larger.

A strength extracting section 4 extracts the received signal strengths of the respective pilot signals repeatedly by the same times, and outputs the extracted received signal strengths to the strength table 6. At the time when the received signal strengths of the pilot signals from the same cell are extracted a predetermined number of times, the strength table 6 calculates the average values of the received signal strengths of the respective signals, detects the average values as received signal strengths of the respective pilot signals, and outputs them. The number of extraction times to be predetermined is set to one, which is enough to calculate the average values of the respective pilot signals.

Assuming that the number of extraction times to be predetermined is five. As illustrated in FIG. 2, at timing 17 when the strength extracting section 4 extracts the received signal strength of the pilot signal A five times, the strength table 6 calculates average values of the received signal strengths of the respective pilot signals A, B, C, and D. As a result, the strength table 6 detects the received signal strengths of the respective pilot signals A, B, C, and D as 3, 4, 2, 1, respectively, and outputs them.

The mobile station reports the calculated average values of the received signal strengths of the respective pilot signals to the control station via the base station in communication. Then, the control station selects a base station, which is positioned at the cell B having the pilot signal whose received signal strength is the highest, as a handover destination base station, thereby carrying out the handover.

In the conventional radio receiving apparatus, however, the number of received signal strength extraction times is the same regardless of the received signal strengths of the respective pilot signals A, B, C, and D, and this requires much time to reach a received signal strength detection timing of each pilot signal, and causes a problem in which the selection of the handover destination cell B at the control station is delayed. The more the number of mobile station peripheral cells where the received signal strengths should be detected, the more time is required till received signal strength detection timing of the respective pilot signals is reached, so that the selection of the handover destination cell B at the control station is more delayed.

The delay of the selection of the handover destination cell B causes the handover to the base station, which is positioned at the cell B having the pilot signal whose received signal strength is the highest, to be delayed at the mobile station. This results in the increase of time required for communication between the mobile station and the base station, which is currently in communication and which is positioned at the cell from which the received signal strength is low, so that communication quality is deteriorated.

DISCLOSURE OF INVENTION

It is an object of the present invention to provide a mobile communication terminal apparatus and a received signal strength detecting method that carry out a handover speedily and prevent a communication quality from deteriorating by reducing a time required to reach a received signal strength detection timing of each pilot signal.

The inventor of the present invention pays attention to the fact in which the reason why much time is required to reach received signal strength detection timing of the respective pilot signals lies in the point that the number of received signal strength extraction times is the same regardless of the received signal strengths of the respective pilot signals. Then, the inventor of the present invention found out the point in which time required to reach received signal strength detection timing is reduced by increasing the number of received signal strength extraction times with respect to the pilot signals having received signal strengths exceeding the predetermined threshold, and achieved the present invention.

In order to attain the above object, according to the present invention, a cell where a base station, which has transmitted pilot signals having received signal strengths exceeding a predetermined threshold, is positioned is used as a candidate of a handover destination cell. Then, time required to reach received signal strength detection timing is reduced by increasing the number of received signal strength extraction times with respect to the pilot signals having received signal strengths exceeding the predetermined threshold.

BEST MODE FOR CARRYING OUT THE INVENTION

The following will specifically explain embodiments of the present invention with reference to the drawings.

First Embodiment

Figure 3:
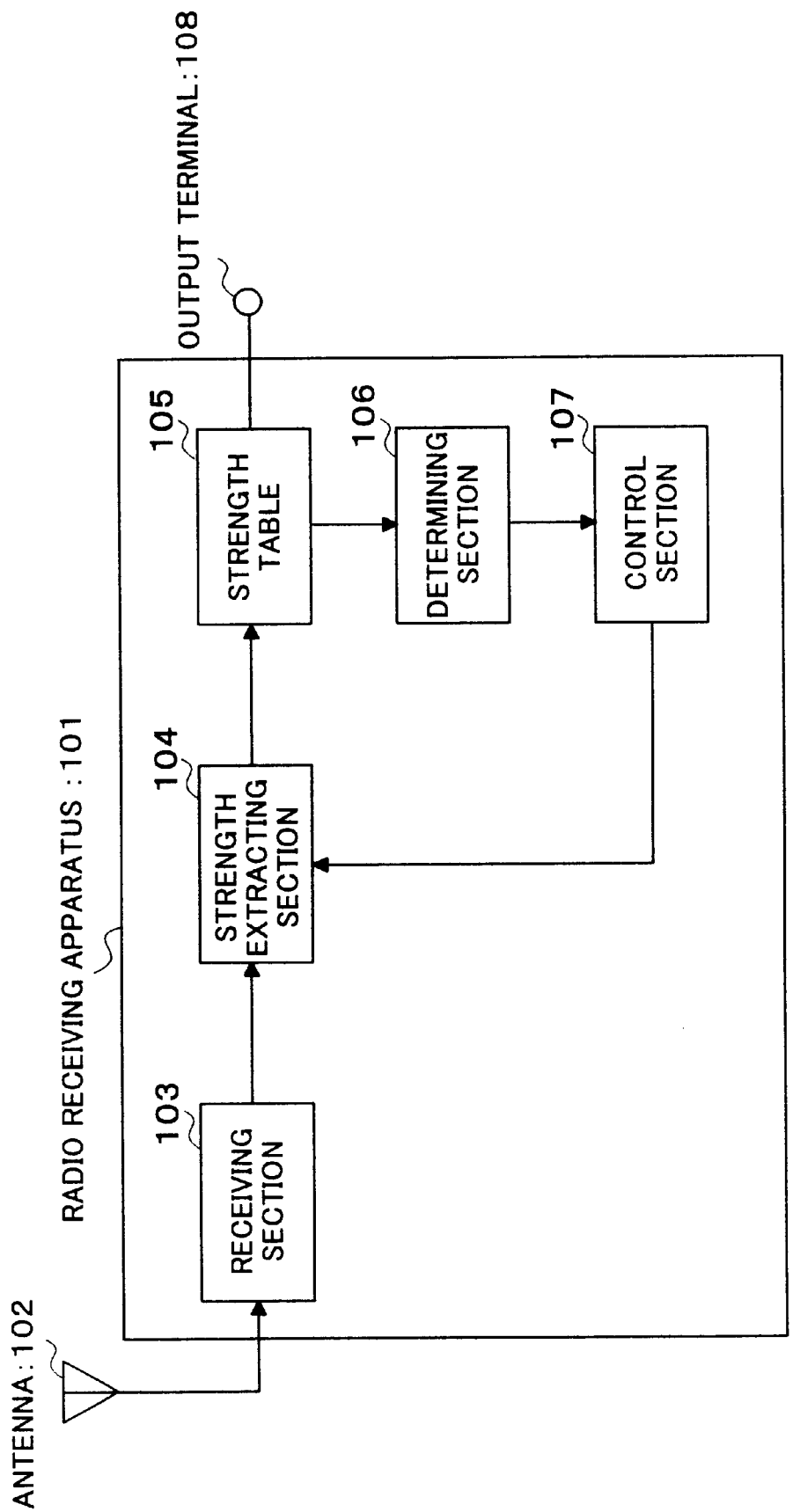
FIG. 3 is a block diagram illustrating a configuration of a radio receiving apparatus according to a first embodiment of the present invention.

FIG. 3 is a block diagram illustrating a log configuration of a radio receiving apparatus according to a first embodiment of the present invention.

In a radio receiving apparatus 101, a receiving section 103 provides predetermined radio processing and demodulation processing to the respective pilot signals of cells on the periphery of the mobile station (hereinafter referred to as "mobile station peripheral cells") received by an antenna 102.

A strength extracting section 104 provides despread processing to the pilot signals demodulated by the receiving section 103 based on a phase and a spreading code, which are indicated by a control section 107, to extract received signal strengths of the pilot signals. A strength table 105 stores the received signal strengths of the respective pilot signals extracted at the strength extracting section 104 until received signal strength detection timing to be described later is reached. Further, the strength table 105 calculates average values of the received signal strengths at the time when the above timing is reached, and the calculated average values are outputted to the other apparatus (not shown) in the mobile communication terminal apparatus from an output terminal 108.

A determining section 106 compares received signal strengths of the respective pilot signal stored in the strength table 105 with a predetermined threshold of received signal strength set by the determining section 106. When the received signal strength of the pilot signal exceeds the predetermined threshold, the determining section 106 outputs a control signal, which indicates a cell from which the pilot signal has the received signal strength that exceeds the predetermined threshold, to the control section.

The control section 107 indicates a spreading code and a phase for performing despread processing to the strength extracting section 104. Also, the control section 107 indicates the number of extraction times, which is needed at the time when the received signal strengths of the respective pilot signals are extracted, to the strength extracting section 104 based on the control signal from the determining section 106.

Figure 4:
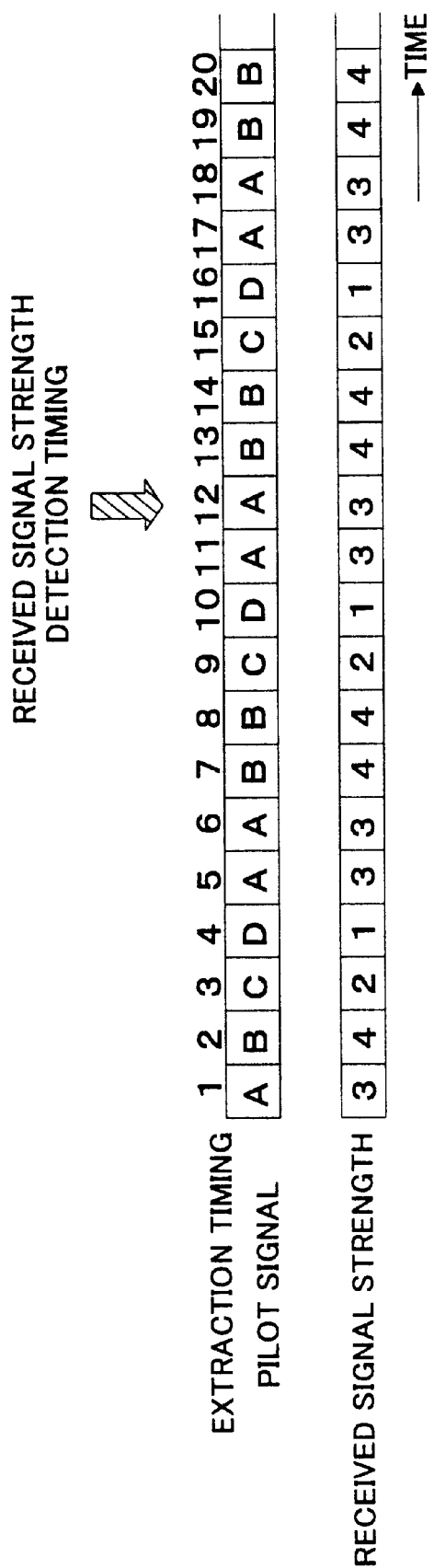
FIG. 4 is a view explaining an operation when received signal strengths are detected using the radio receiving apparatus according to the first embodiment of the present invention.

An explanation will be next given of the radio receiving apparatus having the above strength with reference to FIG. 3 and FIG. 4. FIG. 4 is a view illustrating an operation in which the radio receiving apparatus 101 detects received signal strengths of the respective pilot signals of the mobile station peripheral cells.

The respective pilot signals of the mobile station peripheral cells received by the antenna 102 are subjected to predetermined radio processing and demodulation processing and outputted to the strength extracting section 104 at the receiving section 103.

The strength extracting section 104 provides despread processing to the respective pilot signals subjected to demodulation processing based on a phase and a spreading code, which are indicated by the control section 107, to extract received signal strengths of the pilot signals, and to output the extraction result to the strength table 105.

Here, as shown in FIG. 4, it is assumed that the respective pilot signals received by the radio receiving apparatus 101 from the base station positioned at peripheral cells A, B, C, and D are pilot signals A, B, C, and D, respectively and that the received signal strengths of the respective pilot signals extracted by the strength extracting section 104, are illustrated under the respective pilot signals, and that the received signal strength increases as the number becomes larger.

The strength extracting section 104 extracts received signal strengths as 3, 4, 2 and 1 from pilot signals A, B, C and D at extraction timings 1, 2, 3 and 4, respectively.

The received signal strengths of the respective pilot signals extracted by the strength extracting section 104 are sequentially stored in the strength table 105 until received signal strength detection timing to be described later is reached.

The received signal strength detection timing is set so that average values of the received signal strengths of the respective pilot signals are calculated at the time when the received signal strengths of the pilot signals from the same cell are extracted a predetermined number of extraction times. The number of extraction times to be predetermined is set to one enough to calculate the average values of the respective pilot signals. Now, the explanation hereinafter will be given on the assumption that the predetermined number of times is 5.

In the determining section 106, a predetermined threshold of received signal strength is set. When the received signal strengths of the respective pilot signals are extracted by the strength extracting section 104, the determining section 106 compares the extracted received signal strengths with the predetermined threshold.

As a result, when the extracted received signal strengths exceed the predetermined threshold, the determining section 106 outputs a control signal, which indicates a pilot signal of which the received signal strength exceeds the predetermined threshold, to the control section 107.

For example, it is assumed that the predetermined threshold set in the determining section 106 is "2". Since the received signal strengths of pilot signals A and B exceed "2" at extraction timing 1 to 4 illustrated in FIG. 4, the determining section 106 outputs the control signal, which indicates the received signal strengths of pilot signals A and B exceed the predetermined threshold, to the control section 107.

It is noted that the predetermined threshold of received signal strength as a guideline is set to be one that can ensure sufficient communication quality as a candidate of a handover destination cell.

When the control signal is outputted, the control section 107 instructs the strength extracting section 104 to increase the number of received signal strength extraction times with respect to the pilot signals A and B having received signal strengths exceeding the predetermined threshold. The number of received signal strength extraction times with respect to the pilot signals having received signal strengths exceeding the predetermined threshold is predetermined in the control section 107, and assuming that it is two times.

The strength extracting section 104 extracts the received signal strengths of the pilot signals A and B continuously two times from next extraction timing 5 based on the instruction from the control section 107. As a result, the received signal strength of pilot signal A is extracted continuously two times at extraction timing 5 and 6, and that of pilot signal B is extracted continuously two times at extraction timing 7 and 8.

Regarding the pilot signals C and D, since their received signal strengths do not exceed the predetermined threshold, their received signal strengths are respectively extracted only one time at extraction timing 9 and 10, similar to the previous number of extraction times.

At reception timing 11 and afterward, the received signal strengths of the respective pilot signals are extracted in accordance with the aforementioned number of extraction times.

The extraction of the received signal strengths of the respective pilot signals are carried out at extraction timing as illustrated in FIG. 4 by the aforementioned operation.

The received signal strength detection timing is predetermined in the strength table 105 to be set to the time when the received signal strength of the pilot signal from the same cell is extracted five times. Accordingly, the strength table 105 calculates the average values of the received signal strengths of the respective pilot signals at the time when the received signal strength of the pilot signal A is extracted five times, namely extraction timing 12.

As a result, the strength table 105 detects the received signal strengths of the respective pilot signals A, B, C, and D as 3, 4, 2, 1, respectively, and outputs them to the other apparatus of the mobile communication terminal apparatus.

After that, the mobile station reports the calculated average values of the received signal strengths of the respective pilot signals to the control station via the base station in communication. Then, the control station selects a base station, which is positioned at the cell B having the pilot signal whose received signal strength is the highest, as a handover destination base station, whereby carrying out the handover.

Figure 1:
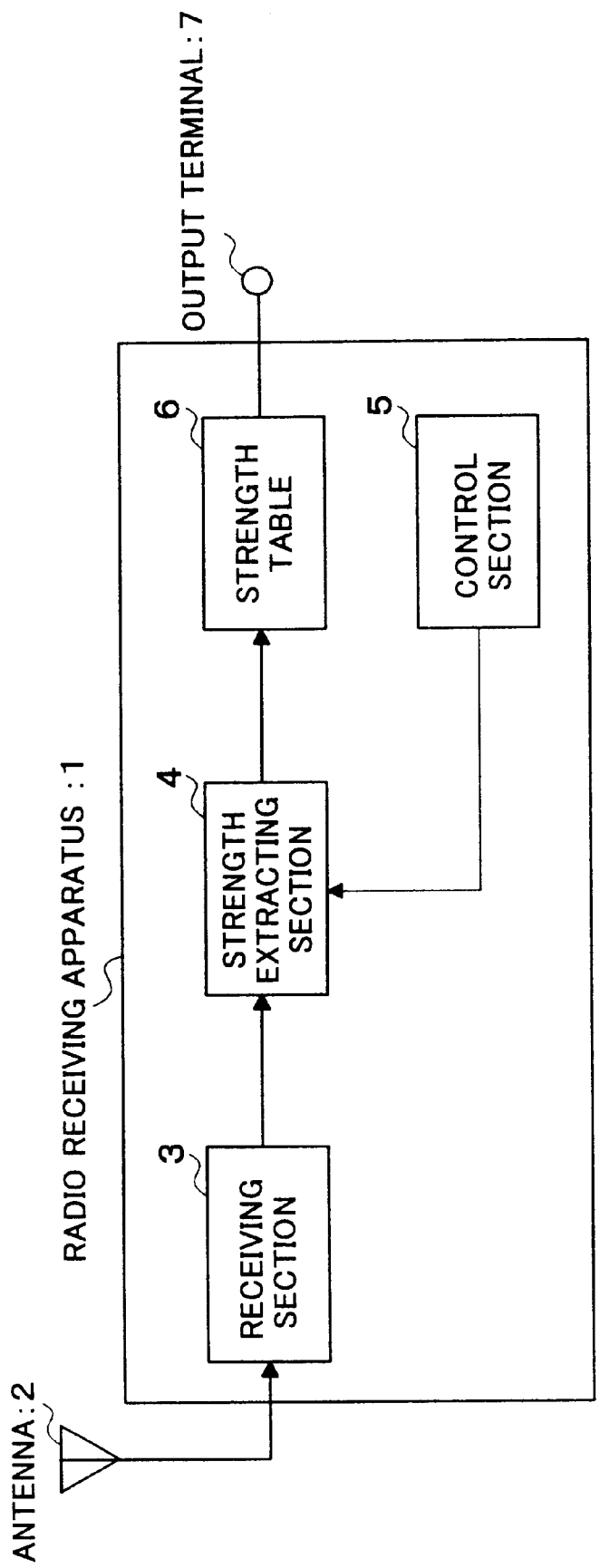
FIG. 1 is a block diagram illustrating a configuration of a conventional radio receiving apparatus.
Figure 2:
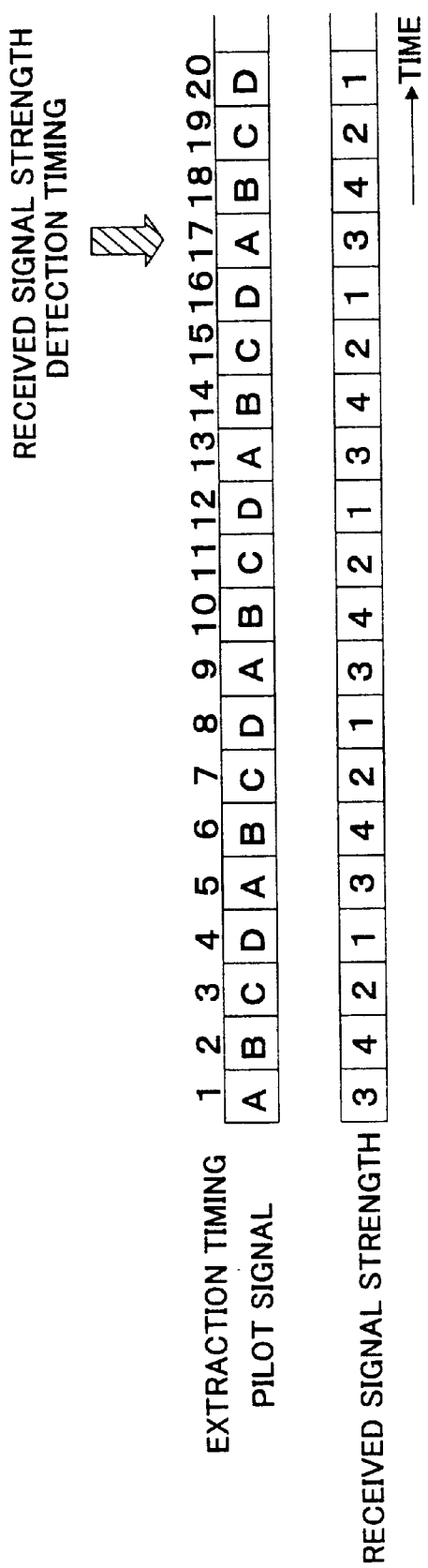
FIG. 2 is a view explaining an operation when received signal strengths are detected using the conventional radio receiving apparatus.

Here, received signal strength detection timing of FIG. 4 is compared with that of FIG. 2 using the conventional technique. When the received signal strengths of the respective pilot signals are the same, it is understood that time required to detect the received signal strengths is reduced even though the average values of the received signal strengths of the respective pilot signals A, B, C, and D detected at the strength table are the same. In this example, it is understood that time required to detect the received signal strengths is reduced to extraction timing 12 from extraction timing 17.

Thus, according to the mobile communication terminal apparatus of this embodiment, time, which is required to reach received signal strength detection timing of the respective pilot signals, can be reduced. As a result, in a mobile communication exchange control apparatus, a handover destination base station can be determined speedily.

Second Embodiment

Figure 5:
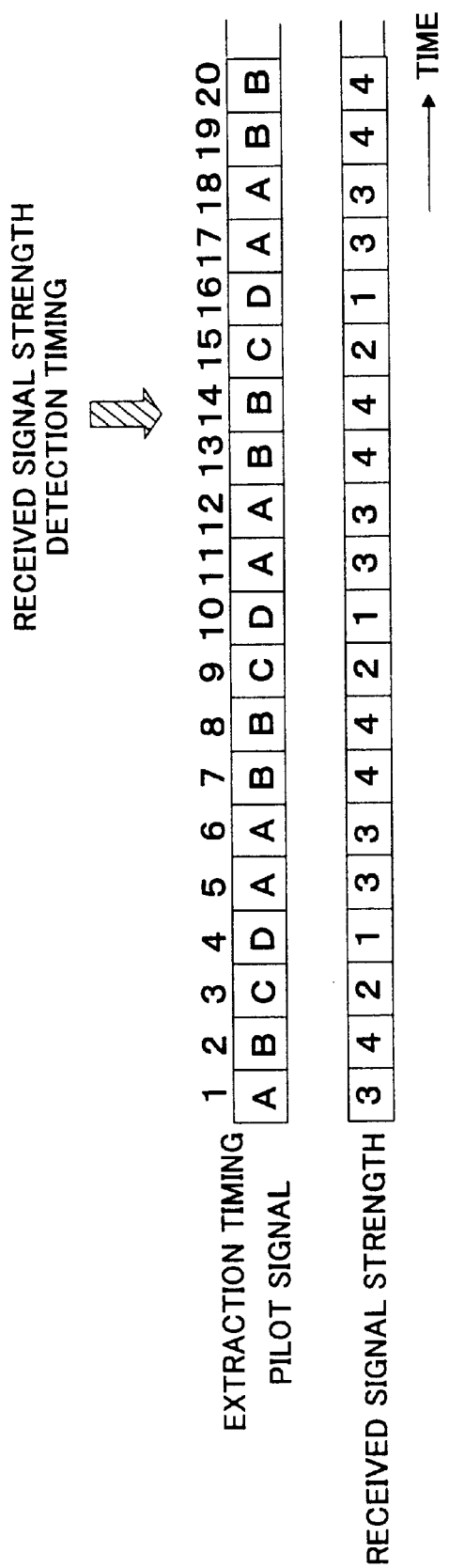
FIG. 5 is a view explaining an operation when received signal strengths are detected using the radio receiving apparatus according to a second embodiment of the present invention.

A second embodiment of the present invention will be explained with reference to FIG. 3 and FIG. 5. FIG. 5 is a view illustrating an operation in which the radio receiving apparatus 101 detects the received signal strengths of the respective pilot signals of the mobile station peripheral cells.

The basic configuration of the radio receiving apparatus 101 of the second embodiment is substantially the same as that of the first embodiment, and the second embodiment is different from the first embodiment in the method for setting received signal strength detection timing predetermined in the strength table 105. Only received signal strength detection timing will be hereinafter explained, and the other explanation will be omitted. The explanation will be given on the assumption that the predetermined number of times and the threshold are the same as those of the first embodiment.

In the first embodiment, received signal strength detection timing is set so that the average values of the received signal strengths of the respective pilot signals are calculated at the time when the received signal strength of the pilot signal from the same cell is extracted a predetermined number of times.

In contrast, according to the second embodiment, there is a case where the received signal strengths of a plurality of pilot signals exceed a predetermined threshold. In this case, received signal strength detection timing is set so that the average values of the received signal strengths of the respective pilot signals are calculated at the time when the received signal strengths of the plurality of pilot signals are extracted a same number of times. Now, it is assumed that the number of times is set to five, similar to the first embodiment.

When received signal strength detection timing is thus set, received signal strength detection timing is as illustrated in FIG. 5. Namely, regarding both of the pilot signals A and B each having received signal strength exceeding the threshold "2", timing 14 at which extraction of received signal strength is carried out five times becomes received signal strength detection timing.

In this way, according to the mobile communication terminal apparatus of this embodiment, received signal strength detection timing is delayed as compared to the first embodiment. However, in a case where the received signal strengths of the plurality of pilot signals exceed the predetermined threshold, the strengths of these pilot signals transmitted by the base station serving as a handover destination candidate are extracted equal times, so as to calculate the average values of the received signal strengths. This improves reliability in deciding the handover destination base station as compared with the first embodiment.

Third Embodiment

Figure 6:
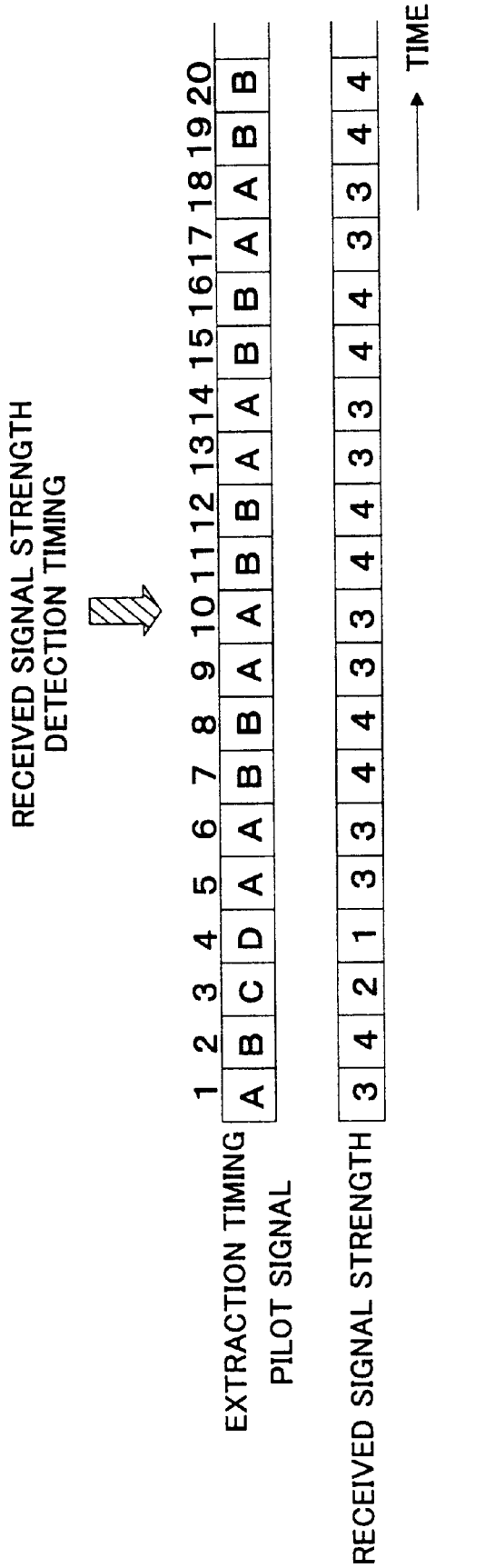
FIG. 6 is a view explaining an operation when received signal strengths are detected using the radio receiving apparatus according to a third embodiment of the present invention.

A third embodiment of the present invention will be explained with reference to FIG. 3 and FIG. 6. FIG. 6 is a view illustrating an operation in which the radio receiving apparatus 101 detects the received signal strengths of the respective pilot signals of the mobile station peripheral cells.

The basic configuration of the radio receiving apparatus 101 of the third embodiment is substantially the same as that of the first embodiment, and the third embodiment is different from the first embodiment in the operation of the control section 107. Only the operation of the control section 107 and received signal strength detection timing will be hereinafter explained, and the other explanation will be omitted. The explanation will be given on the assumption that the predetermined number of times and the threshold are the same as those of the first embodiment.

Regarding the cells where the base stations, which have transmitted the pilot signals C and D having received signal strengths less than the predetermined threshold "2", is positioned, the control section 107 excludes such cells from the handover destination cell candidate at extraction timing 1 to 4. Then, the control section 107 instructs the strength extracting section 104 to carry out the extraction of the received signal strengths of only the pilot signals A and B from extraction timing 5 at which the next received signal strength extraction of the received signal strength is carried out.

Furthermore, regarding the pilot signals A and B having received signal strengths exceeding the predetermined threshold "2", the control section 107 instructs the strength extracting section 104 to carry out the extraction of the received signal strength continuously two times from extraction timing 5 at which received signal strength the next extraction of the received signal strength is carried out, similar to the first embodiment.

As a result, received signal strength detection timing is as illustrated in FIG. 6. In other words, regarding the pilot signal A, timing at which the extraction of the received signal strength is carried out five times becomes received signal strength detection timing.

In the third embodiment, it is possible to add the condition for received signal strength detection timing as described in the second embodiment. In this case, received signal strength detection timing becomes extraction timing 12 of FIG. 6.

Thus, according to the mobile communication terminal apparatus of this embodiment, time required to reach received signal strength detection timing of the respective pilot signals can be further reduced as compared with the first and second embodiments.

In the above explanation, the number of thresholds, which is predetermined in the determining section 106, is set to one. Moreover, regarding the pilot signals of which their received signal strengths exceed the threshold, the number of received signal strength extraction times predetermined in the control section 107 is set to two. However, the present invention is not limited to these values, and a plurality of thresholds may be set, and the number of received signal strength extraction times may be set to three or more.

As explained above, according to the present invention, time required to reach the received signal strength detection timing of the respective pilot signals is reduced, so that the handover can be performed speedily and communication quality can be prevented from deteriorating.

This application is based on the Japanese Patent Application No. HEI 11-231590 filed on Aug. 18, 1999, entire content of which is expressly incorporated by reference herein.

Industrial Applicability

The present invention can be applied to the communication terminal apparatus used in the mobile communication system.

What is claimed is:

1. A mobile communication terminal apparatus comprising:

a controller that compares received signal strengths, extracted from signals transmitted from a plurality of base stations, with a predetermined threshold of received signal strength to control a number of received signal strength extraction times;

an extractor that extracts the received signal strengths in accordance with the number of received signal strength extraction times indicated by the controller; and a detector that detects the received signal strengths when the extraction of the received signal strengths is performed a predetermined number of times, wherein the controller increases the number of received signal strength extraction times for a signal having a received signal strength that exceeds the predetermined threshold.

2. The mobile communication terminal apparatus according to claim 1, wherein the controller decreases the number of received signal strength extraction times for a signal having a received signal strength that is less than the predetermined threshold.

3. The mobile communication terminal apparatus according to claim 1, wherein when there exists a plurality of signals having received signal strengths that exceed the predetermined threshold, the detector detects the received signal strengths when the number of received signal strength extraction times for each of the plurality of signals reaches the predetermined number of times.

4. A received signal strength detecting method comprising:

comparing received signal strengths extracted from signals transmitted from a plurality of base stations with a predetermined threshold of received signal strength to increase a number of received signal strength extraction times for a signal having a received signal strength that exceeds the predetermined threshold, or to decrease the number of received signal strength extraction times for a signal having a received signal strength that is less than the predetermined threshold;

extracting the received signal strengths in accordance with the increased or decreased number of extraction times; and detecting the received signal strengths when the extraction of received signal strengths is performed a predetermined number of times, thereby reducing the time required to reach a received signal strength detection timing.

5. A handover control method for performing a handover using the received signal strength detecting method according to claim 4.

* * * * *